(12) United States Patent
Russell et al.

(10) Patent No.: US 7,155,415 B2
(45) Date of Patent: Dec. 26, 2006

(54) SECURE DIGITAL CONTENT LICENSING SYSTEM AND METHOD

(75) Inventors: Chris Russell, Culver City, CA (US); Todd Avery Outten, Los Angeles, CA (US); Bryan Gentry Spaulding, San Francisco, CA (US); Scott Jeffrey Sherr, Brentwood, CA (US); Ira Steven Rubenstein, Los Angeles, CA (US); Yair Landau, Pacific Palisades, CA (US); Brian David Lakamp, Malibu, CA (US); Jeremy Eli Barnett, Pacific Palisades, CA (US); Douglas Daiseug Chey, Santa Monica, CA (US); Michael R. Arrieta, Rolling Hills Estates, CA (US); Mary Korman, Venice, CA (US); Harish Mandyam, Playa del Rey, CA (US); Thomas M. Rodriguez, Culver City, CA (US); Andrew Mosson, San Francisco, CA (US); Ernesto Brodersohn, Burlingame, CA (US); Mary Abraham, Oak Park, CA (US)

(73) Assignee: Movielink LLC, Santa Monica, CA (US)

( * ) Notice: Subject to any disclaimer, the term of this patent is extended or adjusted under 35 U.S.C. 154(b) by 661 days.

(21) Appl. No.: 09/827,469

(22) Filed: Apr. 6, 2001
(Under 37 CFR 1.47)

(65) Prior Publication Data
US 2002/0049679 A1 Apr. 25, 2002

Related U.S. Application Data

(60) Provisional application No. 60/195,870, filed on Apr. 7, 2000, provisional application No. 60/273,444, filed on Mar. 5, 2001.

(51) Int. Cl.
*G06F 17/60* (2006.01)
(52) U.S. Cl. .......................... 705/59; 705/50; 705/57; 705/52
(58) Field of Classification Search .................. 705/59, 705/52
See application file for complete search history.

(56) References Cited

U.S. PATENT DOCUMENTS

| | | | |
|---|---|---|---|
| 5,210,829 A | 5/1993 | Bitner | |
| 5,261,072 A | 11/1993 | Siegel | |
| 5,323,244 A * | 6/1994 | Yamaguchi et al. | 386/94 |
| 5,400,402 A | 3/1995 | Garfinkle | |
| 5,687,235 A | 11/1997 | Perlman et al. | |
| 5,745,879 A | 4/1998 | Wyman | |
| 5,784,546 A | 7/1998 | Benman, Jr. | |
| 5,790,423 A | 8/1998 | Lau et al. | |
| 5,790,664 A | 8/1998 | Coley et al. | |
| 5,864,823 A | 1/1999 | Levitan | |
| 5,878,429 A | 3/1999 | Morris et al. | |
| 5,907,837 A | 5/1999 | Ferrel et al. | |
| 5,909,638 A | 6/1999 | Allen | |
| 5,933,498 A | 8/1999 | Schneck et al. | |
| 5,956,716 A | 9/1999 | Kenner et al. | |
| 5,966,440 A | 10/1999 | Hair | 380/4 |
| 6,006,264 A | 12/1999 | Colby et al. | |
| 6,014,651 A | 1/2000 | Crawford | |
| 6,055,314 A | 4/2000 | Spies et al. | |
| 6,055,566 A | 4/2000 | Kikinis | |
| 6,081,840 A | 6/2000 | Zhao | |
| 6,101,485 A | 8/2000 | Fortenberry et al. | |
| 6,122,648 A | 9/2000 | Roderick | |
| 6,182,218 B1 | 1/2001 | Saito | |
| 6,185,619 B1 | 2/2001 | Joffe et al. | |
| 6,189,008 B1 | 2/2001 | Easty et al. | |
| 6,189,146 B1 | 2/2001 | Misra et al. | |
| 6,226,618 B1 | 5/2001 | Downs et al. | |
| 6,233,682 B1 | 5/2001 | Fritsch | |
| 6,236,805 B1 | 5/2001 | Sebestyen | |
| 6,268,856 B1 | 7/2001 | Bruck et al. | |
| 6,813,709 B1 * | 11/2004 | Benardeau | 713/172 |
| 2002/0052933 A1 * | 5/2002 | Leonhard et al. | 709/219 |

| | | | |
|---|---|---|---|
| 2004/0205358 | A1* | 10/2004 | Erickson ..................... 713/200 |

FOREIGN PATENT DOCUMENTS

| | | | |
|---|---|---|---|
| EP | 1480101 | A2 * | 11/2004 |
| WO | WO 0059151 | | 10/2000 |

OTHER PUBLICATIONS

PCT International Search Report as issued in International Application No. PCT/US01/11452, Mailing Date Nov. 8, 2001.

PCT International Search Report as issued in International Application No. PCT/US01/11124, Mailing Date Oct. 18, 2001.

\* cited by examiner

*Primary Examiner*—Firmin Backer
(74) *Attorney, Agent, or Firm*—Sidley Austin LLP

(57) ABSTRACT

Embodiments of the present invention overcome the problems in the existing art described above by providing a secure digital content licensing system and method. Rental of the digital content occurs within an online environment including one or more user network-enabled devices and one or more server network devices connected by a communications link to the one or more user network-enabled devices. A user selects content displayed on a main website and requests download of the selected content to the user network-enabled device. To be able to access the content the user must obtain a license. The user's request for a license for specific content comprises information about a desired rental model, an expiration date for the rental model, and information that identifies the user's user network-enabled device, along with other information. A license for the content is generated which comprises the above information and also includes an encryption key for the selected movie. Media player and security technology residing on the user network-enabled device provides protection against unauthorized access to the content by ensuring that only licensed content is viewed and is accessed according to the rental model contained in the license. Media player and security technology also provides security against tampering by performing integrity checks on its various components and other components within the user network-enabled device. Revocation of access rights is made possible by revocation certificates that inhibit accessing of particular content for various reasons including compromised files or components.

53 Claims, 6 Drawing Sheets

SECURE DIGITAL CONTENT LICENSING SYSTEM AND METHOD

RELATED APPLICATIONS

This application claims priority to Provisional Application No. 60/195,870, filed Apr. 7, 2000, and to Provisional Application No. 60/273,444, filed Mar. 5, 2001, each of which is hereby incorporated by reference. The present invention also relates to U.S. patent application Ser. No. 09/603,805, filed Jun. 20, 2000 (for which a Petition to Convert Non-Provisional Application to Provisional Application Under 37 CFR 1.53(c)(2) was filed Mar. 16, 2001 via U.S. Express Mail Label No. EL752586903US, our file number 041892-0208, decision of petition and provisional serial number unknown at this time), is incorporated herein by reference and which forms a basis for priority. The present invention also relates to U.S. patent application Ser. No. 09/826,323, titled "Online Digital Video Signal Transfer Apparatus and Method," filed Apr. 4, 2001, which is incorporated herein by reference and which forms a basis for priority. The present invention also relates to U.S. patent application Ser. No. 09/828,406, titled "Website System And Process For Selection And Delivery Of Electronic Information On A Network," filed Apr. 6, 2001; and U.S. Patent Application Ser. No. 60/273,444, titled "System and Process For Delivery Of Content Over A Network," filed Apr. 6, 2001, each of which is incorporated by reference in its entirety.

BACKGROUND OF THE INVENTION

1. Field of the Invention

The invention relates generally to systems and processes for securing licenses for content over a network and, in particular embodiments, to systems and processes for controlling access to content items with licenses delivered over the Internet or other suitable network.

2. Description of Related Art

The Internet is a global network which allows users to access server network devices from the user's personal computer or other user network-enabled device. As the Internet has grown, more and more users are taking advantage of the many lifestyle improvements which the Internet provides. One of these improvements is a new medium for commerce, commonly referred to as electronic commerce (or Ecommerce). Users are able to shop on-line at home for many of the items, such as books, toys, video games, and movies, that they used to purchase in brick and mortar stores. Some of these items are delivered to the user by traditional package delivery methods. Others, such as music and video, may be downloaded as large files to the user over a communication link. Typically, the Internet merchant would like to control access to content such that only the customer who paid for the delivered content will be able to enjoy access to that content.

Along with the growth in Internet commerce, however, there has been a corresponding growth in security concerns. Internet merchants are encountering many instances of unauthorized use of content by Internet users who have not legitimately purchased a right to access the content. This unauthorized use of content may be the result of users swapping downloaded files with other users or obtaining the content by other fraudulent means.

There exist many methods of content protection. File encryption methods provide limited protection. In addition, methods to verify that a particular user is an authorized user are constantly improving. However, code breaking techniques improve apace with improved encryption methods and it remains a problem to authenticate the identity of a particular user due to the sheer number of users on the Internet and due to sophisticated methods of impersonating not only other users, but also the computers of other users.

Therefore, there is an increasing need among Internet content providers to ensure only authorized use of the content which they provide to paying customers.

SUMMARY OF THE DISCLOSURE

Embodiments of the present invention overcome the problems in the existing art described above by providing a secure digital content licensing system and method. Embodiments of the invention operate within an online environment including one or more user network-enabled devices and one or more server network devices connected by a communications link to the one or more user network-enabled devices.

A method according to an embodiment of the invention includes providing access to content stored within a memory of one or more content servers. A user contacts a main website. The main website displays to the user the content that is available. The user may then select and download content to the user network-enabled device. Because the content is not accessible to the user in a user-perceptible form without a license, the user will be required to obtain a license either before, after, or at the same time the content is downloaded.

The user's request for a license for specific content may comprise information about a desired rental model, an expiration date for the rental model, and information that identifies the user network-enabled device, along with other information. Based on this information and other information that may be added at a network operations center, a license for the content is generated which comprises this information along with any additional information added at the time of license generation, for example, an encryption key for the requested content. The license is then transferred to a protected database on the requesting user network-enabled device.

Media player and security technology residing on the user network-enabled device provides protection against unauthorized access to the content by ensuring that only licensed content is presented in a user-perceptible form and is only accessed according to the rental model contained in the license. Media player and security technology also provides security against tampering by performing integrity checks which authenticate various components of the media player and security technology itself, along with other components within the user network-enabled device.

Advantages of the invention include the ability to securely control access to content by providing a system and method for generating a license for content that is associated with that content and can only be enabled for that particular content. In addition to being related to its associated content, the license is also related to the particular user network-enabled device to which the license is downloaded. Further, the license is related to the particular media player that resides on that user network-enabled device at the time the license is downloaded.

Before a license is enabled, the license must be authorized by the media player and security technology which examines the license to determine if the above-named conditions exist, i.e. if the license is associated with the particular content that the user is attempting to access, and if the user network-enabled device and media player with which the user is attempting to access the particular content are the ones related to that license. If these conditions are satisfied, then the license will be enabled and the user will be able to access the particular content in a user-perceptible form based on a particular rental model for that particular content.

In one embodiment, licenses are based on a rental model which restricts access to the particular content to within a certain time frame. Thus, in one embodiment the user may access the content a defined number of times within the time frame. In yet other embodiments, a license based on a purchase model allows the user to access content an unlimited number of times on any user network-enabled device.

Further advantages of the invention include the ability to revoke a previously issued license to access particular content on particular media players within particular media and security procedure environments. In addition, the present invention provides a system and method for issuing revocation certificates to particular user network-enabled devices that inhibit playing of particular content or the playing of content within a particular media and security procedure environment. In one embodiment, revocation certificates are periodically downloaded to user network-enabled devices. In another embodiment, revocation information is downloaded to user network-enabled devices by being embedded in a requested license for selected content.

BRIEF DESCRIPTION OF THE DRAWINGS

The present invention is illustrated by way of example, and not by way of limitation, in the figures of the accompanying drawings and in which.

DETAILED DESCRIPTION OF VARIOUS EMBODIMENTS

Figure 1:
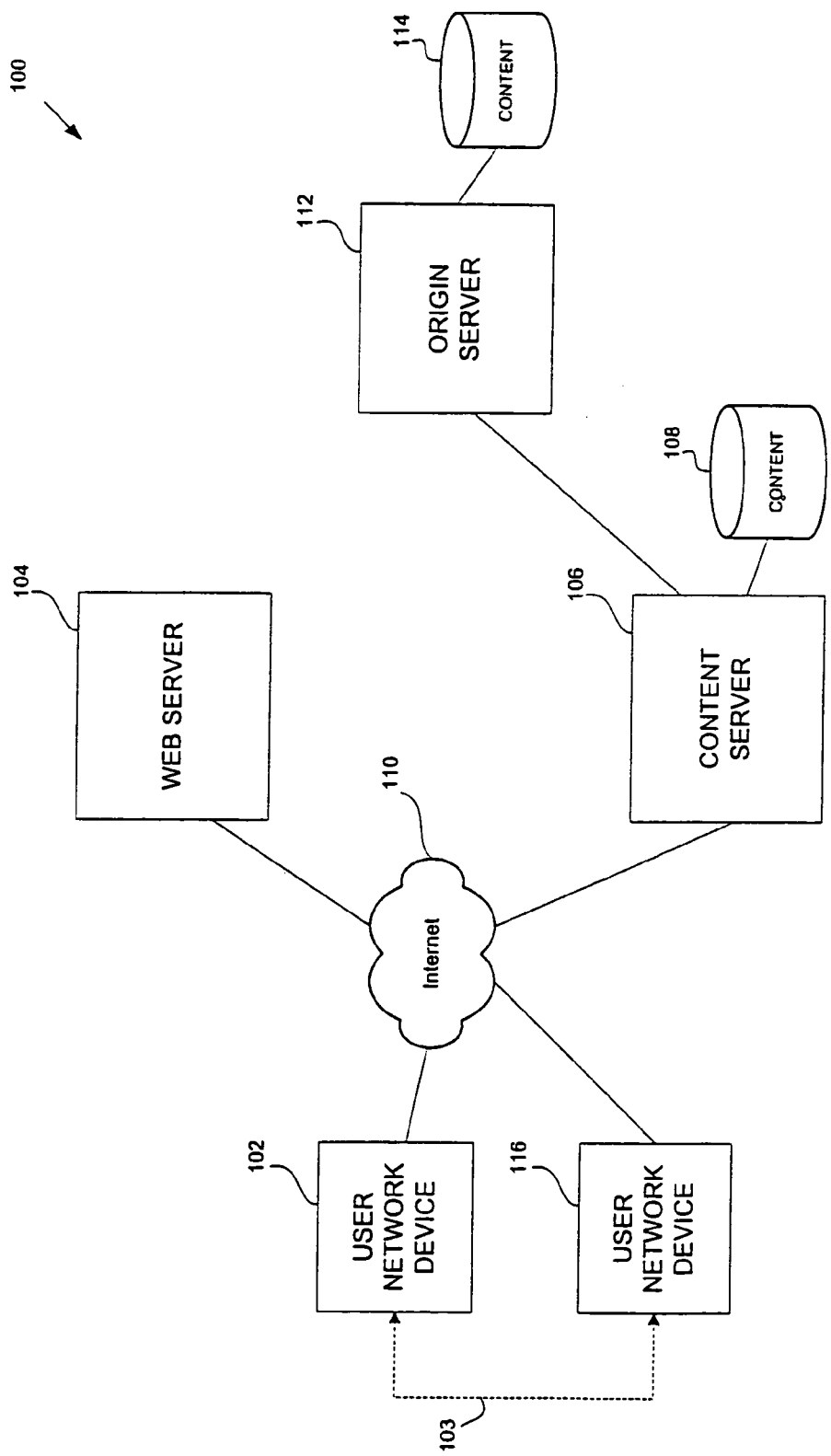
FIG. 1 is a simplified view of an exemplary client-server environment in which embodiments of the present invention may be implemented.

Embodiments of the present invention address needs in the industry as described above by providing a secure digital content licensing system and method, for example enabling online rental, purchase and/or delivery of digitally encoded motion pictures. Systems and processes according to embodiments of the present invention provide a content owner or holder with a mechanism for controlling distribution of content to users by allowing users to access the content through a network. One example model for the system and process is a movie rental system for downloading movie files to customers across the Internet. Other embodiments may involve delivery of other types of content including, but not limited to, music files, still image files, game programs, other software or data, and combinations thereof. Moreover, other embodiments may employ distribution of encoded physical media, or wide area or local area networks. For purposes of simplifying the present disclosure, embodiments described herein are primarily with reference to a movie rental service. However, it will be readily understood that aspects of the invention may be employed in other suitable content delivery applications as noted above.

In the following description, reference is made to the accompanying drawings which form a part hereof, and in which are shown by way of illustration specific embodiments in which the invention may be practiced. It is to be understood that other embodiments may be utilized and structural changes may be made without departing from the scope of the various embodiments of the present invention.

In one embodiment, a secure movie licensing system and method provides data stored on a computer system to a user across a network connection. The transfer may be accomplished in various ways, including, but not limited to, download to memory storage, streaming video, audio, or a combination, across various types of connections, including, but not limited to, the Internet, private or public networks, direct wire or fiber connections, wireless connections, broadcast systems (e.g., cable systems, satellite systems, broadcast television systems, broadcast digital television systems) or a combination of connections. In other embodiments the movie is encoded on tangible media and physically distributed.

Further embodiments of the invention relate to aspects of securely licensing electronic files. For clarity, the description focuses on implementations for digital data signals comprising video and audio information which include digitally encoded movies (referred to as "movies" or "videos"). However, many or all of the methods and system described may be readily adapted to apply to electronic files of other types as well, such as digitally encoded songs, books, television programming, radio programming, and any other content (audio, video, text, etc.) which may be digitized or encoded and stored as an electronic file. Also, control information including, but not limited to, video aspect ratio, resolution, and audio playback parameters may also be included in the electronic file.

Some embodiments of the invention relate to implementations for a network movie (hereafter "video") server computer system accessible through the World Wide Web and the Internet as a website (referred to as the "main website") and providing access to a library of movie files. However, many or all of the methods and systems described may be readily adapted to other data connections as well, including, but not limited to, other Internet connection interfaces (e.g., an FTP server), private networks (e.g., a network provided by an ISP for its subscribers), and direct connections (such as a directly wired set of stations in a limited area such as a hotel).

In addition, further embodiments relate to implementations where the user accesses and downloads electronic files using a computer system. However, many or all of the methods and systems described may be readily adapted to other user network-enabled devices (UNDs) which the user may use to access and download data from the server as well, such as a set-top box, or a television, with a connected telephone, or cable modem and available storage memory (such as a hard disk), or some other device with a network connection which may access the server and a storage device for storing a downloaded file. Additional variations may also be implemented such as interfaces for wireless telephones, set-top-boxes, PDAs, AVHDD devices (such as a SONY "Tivo" device), and for satellite download capability.

Any necessary adaptations will be apparent to those of ordinary skill in the art. The secure online digital content licensing method and system may be implemented in hardware, software, or a combination of both.

According to one embodiment, rental of the content occurs within an online environment including at least one content server located at a first node and connected by a communications link to a plurality of UNDs located at other nodes. The method includes providing access to content stored within a memory of a content server. Requests are then submitted by UNDs for rental of selected content for a specified period of time or for a specified number of plays ("rental model"). The requests include electronic payment for a license based on the selected content and the specified rental model. In one embodiment, once electronic payment is provided, the license is transmitted to the UND via a communications link. Once the content and the license are transmitted to the UND, the content is accessible to the user on the UND in a user-perceptible form in accordance with the rental model contained in the license.

In one embodiment, the UND may establish electronic communication with the main website prior to permitting access to the content in a user-perceptible form to ensure that the access is within the specified rental model parameters, and optionally that the UND to which the license was transmitted is the UND that will be used for access. This ensures that content downloads that are conveyed to other parties who may also wish to access the content are not accessible to those other parties. In the event that those other parties attempt to access the content that was conveyed to them, the main website may provide to the other parties the opportunity to purchase a rental license (also referred to as a license or license certificate).

In one embodiment, functions are implemented with machine-executable instructions. The instructions may be used to cause a general-purpose or special-purpose processor that is programmed with the instructions to perform the functions and steps described herein. Alternatively, the functions and steps may be performed by specific hardware components that contain hardwired logic for performing the steps, or by any combination of programmed computer components and custom hardware components.

Embodiments of the present invention may be implemented as a computer program product which may include a machine-readable medium having stored thereon instructions which may be used to program a computer (or other electronic devices) to perform a process according to embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, embodiments of the present invention may also be implemented as a computer program product, wherein the program may be transferred from a remote computer (e.g., a server) to a requesting computer (e.g., a client) by way of data signals embodied in a carrier wave or other propagation medium via a communication link (e.g., a modem or network connection).

Network System Architecture

FIG. 1 is a simplified view of an exemplary client-server environment 100, such as the World Wide Web (the Web), in which the secure online digital content licensing method and system may be implemented. The architecture of the Web follows a conventional client-server model. The terms "client" and "server" are used to refer to a computer's general role as a submitter of requests for data (the client) or provider of data (the server). The UND 102 and Web server 104 communicate using a protocol such as HyperText Transfer Protocol (HTTP). In the Web environment, Web browsers reside on clients and render Web documents (pages) served by the Web servers. The client-server model is used to communicate information between UND 102 and Web server 104.

Web server 104 is coupled to a network 110, for example the Internet, and responds to document requests and/or other queries from Web clients. When a user selects a document by submitting its Uniform Resource Locator (URL), a Web browser, such as Netscape Navigator or Internet Explorer, opens a connection to Web server 104 and initiates a request (e.g., an HTTP get) for the document. Web server 104 delivers the requested document, typically in the form of a text document coded in a standard markup language such as HyperText Markup Language (HTML) or Dynamic HTML (DHTML)

According to one embodiment, when a user wishes to participate in secure online licensing of digital content, for example digitally encoded movies ("movies"), the UND 102 connects to Web server 104 and is presented with the main website home page. The main website provides access to online catalog information regarding various movies for rental. From the main website home page, the online user is forwarded to various screens that allow the user to search and view various movies available for rental as well as the capability to download movies for viewing on UND 102 at a later time.

In one embodiment, when the user requests a movie, Web server 104 provides a URL for the location of the movie to UND 102. The URL directs the request to content server 106. Content server memory 108 provides storage for a large volume of digitally encoded movie files. The digitally encoded movie files that reside in content server memory 108 may be encrypted using standard encryption techniques. Content server 106 will deliver the requested movie in an encrypted form to UND 102 if the requested movie resides on content server 106. In one embodiment, if the requested digitally encoded movie does not presently reside on content server 106, the request will be forwarded to additional content servers (not shown) located in different geographical locations within the exemplary client-server environment 100 until the movie is located. At that point, the movie will be downloaded in an encrypted form to UND 102 by the respective content server.

In one embodiment, if the movie does not presently reside on any of the content servers, then the content will be downloaded to one of the content servers from origin server 112. Origin server 112 may contain a complete copy of the library of the encrypted digitally encoded movie files on origin server memory 114. Further, in some embodiments, there may be additional origin servers (not shown) located in different geographical locations in client-server environment 100, each comprising a copy of the entire library of the encrypted digitally encoded movie files.

In other embodiments, movie files residing on other UNDs, such as UND 116, may be identified as available for download to a requesting UND, such as UND 102, as either a direct peer to peer connection, represented by broken line 103, or through Web server 104, with Web server 104 managing at least the search and download operations.

In some embodiments, a token may be embedded in the URL which authenticates the right of the user to download the requested movie. The token may be generated at the time of the original request. One purpose for token authentication is to restrict movie downloads only to the user that has actually requested the movie. This results in cost savings, since each unauthorized download has certain costs associated with it. In addition, token authentication prevents attacks by hackers intent on causing service disruption by instigating multiple download requests which tie up the resources of content server 106. Additionally, in some embodiments, the URL may also contain a geographic filter which restricts the downloading of movies to certain geographical locations, for example, downloads may only be permitted within the United States.

UND 102 may be any type of computing device such as, but not limited to, desktop computers, workstations, laptops, a set-top box, and/or mainframe computers. Additional variations may also be implemented such as interfaces for wireless telephones, set-top-boxes, PDAs, AVHDD devices (such as a SONY "Tivo" device), and for satellite download capability. One or more users not shown may be associated with each UND 102. Web server 104, content server 106, and origin server 112 may also be any type of computing device such as, but not limited to, desktop computers, work stations, laptops, and/or main frame computers.

Network Operations Center

Figure 2:
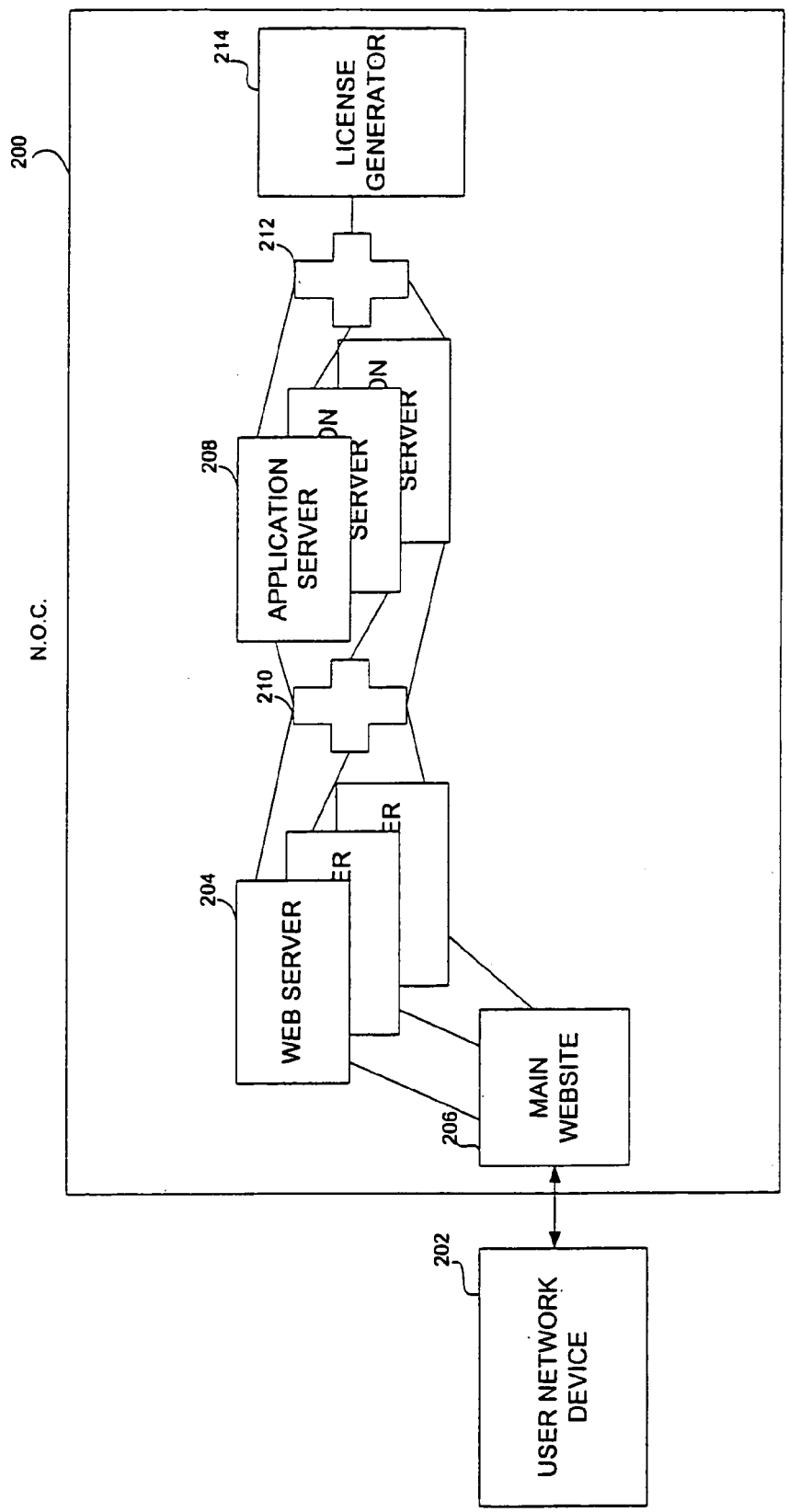
FIG. 2 is a simplified block diagram view of a user network-enabled device connected to a network operations center according to an embodiment of the invention.

FIG. 2 shows a simplified block diagram of a network operations center (NOC) 200, according to one embodiment of the invention. NOC 200 comprises multiple Web servers 204, multiple application servers 208, firewalls 210 and 212, license generator 214, and main website 206. Web servers 204 deliver documents such as HTML and DHTML documents requested by a user through UND 202, as well as storing other documents and files (audio, video, graphics, or text) that may be displayed to the user on main website 206. Application servers 208 may create dynamic Web pages which may be provided to Web server 204 and that may be displayed to the user on the main website. Application servers 208 may also contain personalization information on different users of the main website such as, but not limited to, user personalized home pages and user shopping habits. In one embodiment, application servers 208 also store business rules for movie license acquisition by users of main website 206. As discussed in more detail below, these business rules define who may acquire a license to view a movie and under what conditions (i.e., time period, number of viewings within the time period).

Since the information contained on application servers 208 may be a target of unauthorized access, a firewall 210 is located between the Web servers 204 and application servers 208. Firewall 210 provides security for the application servers 208 by controlling access to the application servers 208. In one embodiment, firewall 210 is implemented as a packet filter type firewall which examines traffic at the network protocol packet level. Firewall 212 provides the same function between application servers 208 and license generator 214. Thus, firewall protection provides security against unauthorized access to the application servers 208 and the license generator 214.

Application servers 208 are authorized to access license generator 214 through firewall 212. The license generator 214 will generate a license for a user-requested movie based on the business rule information passed to license generator 214 by application servers 208.

Figure 3:
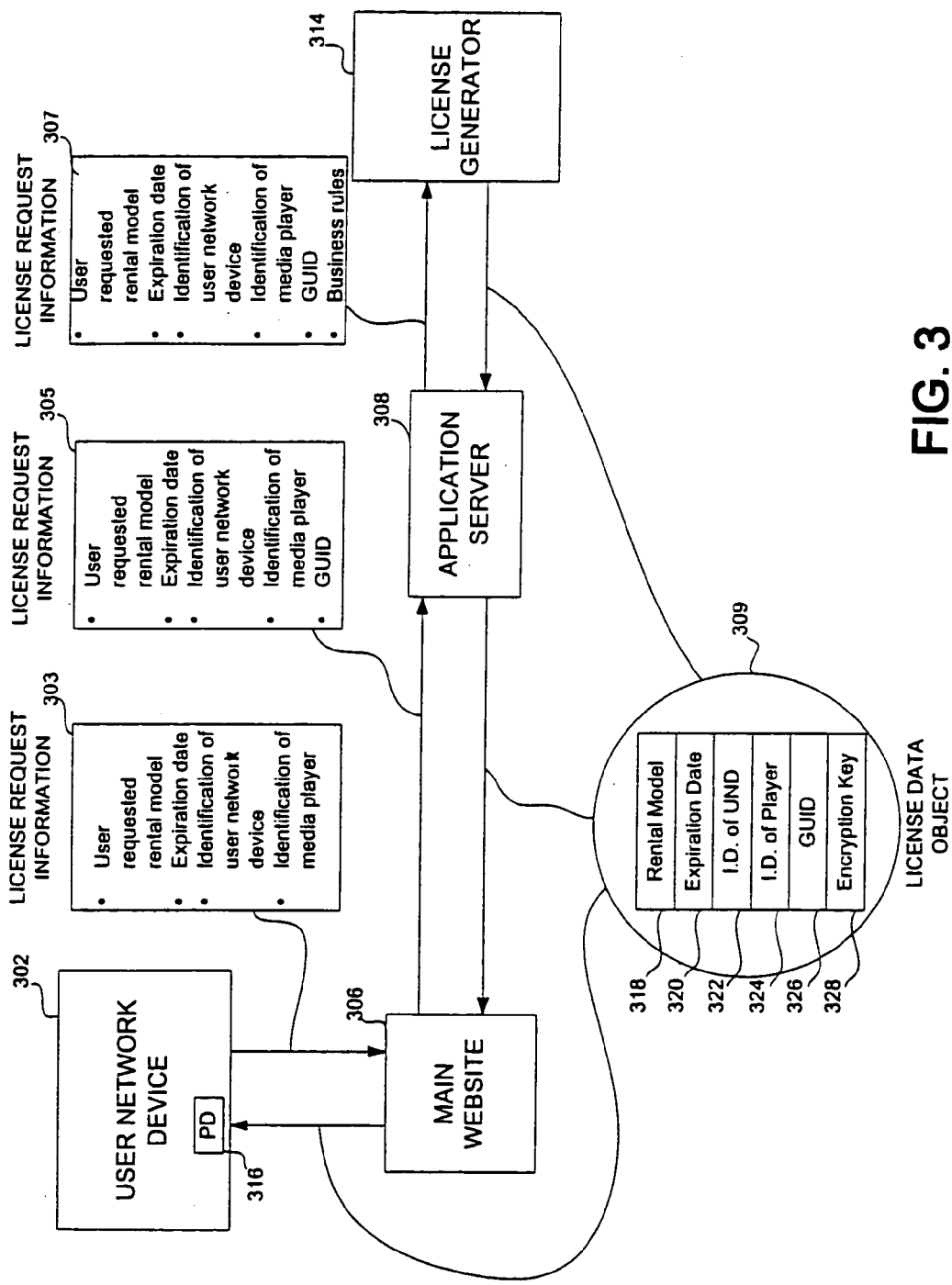
FIG. 3 is a simplified block diagram view of a license generation process according to an embodiment of the invention.

A process by which a user requests a movie and a license for that movie is generated, according to one embodiment, is illustrated by the block diagram in FIG. 3. When a user at UND 302 requests a license to content while browsing on the main website 306, license request information block 303 is provided to main website 306. License request information block 303 may include information about the rental model that the user desires. As an example, the user may wish to view the movie during a 24 hour period, the 24 hour period beginning when the user pushes the play button on the user's media player. In one embodiment, the user would then have 30 days in which to start the 24 hour period before the license expires. In one embodiment, when the license expires it may remain on the user's UND but may not be used to access its associated movie.

According to one embodiment, information about the user's UND 302 is also provided in license request information block 303, transparently to the user. This information may, for example, include the hard drive serial number, BIOS checksum, or other information used to identify the particular UND. In addition, information may be included in license request information block 303 identifying the particular media player that will be used to access the content. In some embodiments, the initial license request from UND 302 may only include the identification information about UND 302 or some other information sufficient to begin the license request process. In this embodiment, additional information such as, but not limited to, the rental model information and media player identification information described above may subsequently be added to the license request before the license is generated. This information will subsequently be passed by application server 308 to license generator 314 and may then be embedded in the license to ensure that the requested movie associated with the license is only played on the identified UND and only by the identified media player. The process by which the identity of the UND and media player is verified will be discussed in more detail below.

In one embodiment, when the user purchases a license, the user has the choice between transferring the purchased license immediately to the UND currently being used, or transferring the purchased license later to the same UND or a different UND. If the user transfers the purchased license immediately, then the purchased license will be related to that UND and media player. Thus, if the user later copies the purchased license to a different UND (which also contains a copy of the associated content), that purchased license would not be valid and could not be enabled. If, however, the user does wish to view the content on a UND other than the one currently being used to access the main website, the user will be required to connect to the main website again at a later time using that particular UND and transfer the purchased license to that UND.

To download the license at a later time, a user may use either the media player or a Web browser to connect to the main website and request the purchased license. In the case where the media player is used to connect to the main website, when the user attempts to access the content, the media player recognizes that the user requires a license and connects the user to the main website. If the user has not yet purchased a license, for example if the user received a copy of the content from another user, the main website will query the user as to the purchase of a license.

In addition, in one embodiment a 128 bit Globally Unique IDentifier (GUID), which is associated with the requested movie file or, in some embodiments, with the movie, is added by main website 306 to the request information, as shown by license request information block 305, and is then passed to the application server 308. In one embodiment, application server 308 will add business rule information to the request information, as shown by license request information block 307. License request information block 307 is subsequently passed by the application server 308 to license generator 314.

License generator 314 receives the information provided in license request information block 307 and generates a license associated with the requested movie. In one embodiment, the license may be in the form of a license data object 309 comprising a plurality of data fields. In one embodiment, a portion of the data fields may contain the license information block 307 information that was passed to the license generator 314 by application server 308, along with additional information generated by the license generator 314.

As an example of information within license data object 309 that was passed to license generator 314, there is a data field 318 which contains information on the rental model requested by the user. There is also a data field 320 which contains information on the date on which the user's ability to play the movie will expire. Data field 322 contains identification information on the user's UND. Data field 324 contains identification information on the user's media player. In addition, data field 326 contains the 128 bit GUID that is associated with the requested movie file or movie. As one example of information that is not passed to license generator 314 but instead may be generated by license generator 314 itself, data field 328 contains an encryption key that is associated with the requested movie file and unlocks the encrypted movie file. The information contained in license data object 309 is referred to collectively as "access information."

License data object 309 is passed by license generator 314 to application server 308. Application server 308 then passes license data object 309 to main website 306. Main website 306 then transfers license data object 309 to UND 302, where it is stored in a protected database (PD) 316.

User Network-enabled Device Architecture

Figure 4:
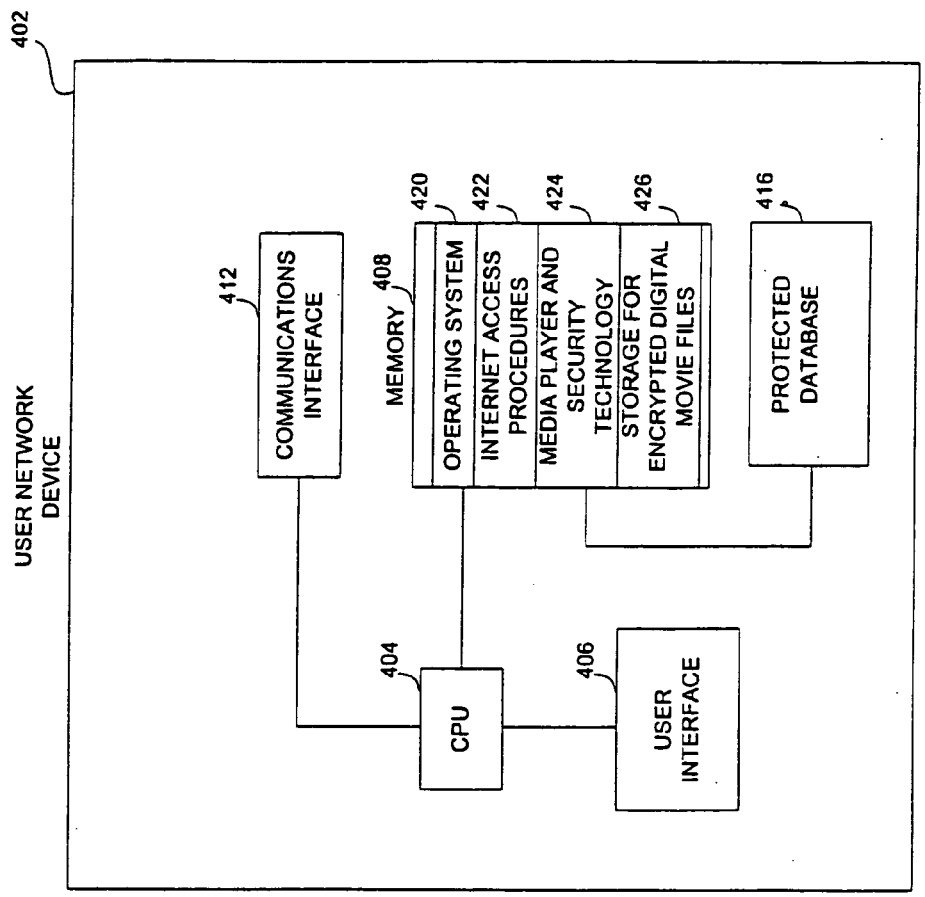
FIG. 4 is a functional block diagram view of a user network-enabled device according to an embodiment of the invention.

FIG. 4 shows a functional block diagram view of a UND 402 which includes a CPU 404, a user interface 406, a memory 408, and a communications interface 412. The communications interface 412 is used to communicate with a network video server computer such as Web server 104 and content server 106 in FIG. 1 or with other system resources not shown. The communications interface 412 provides a network connection. While any connection rate may be used, a high speed or broadband data connection, such as a connection providing a data rate of 500 kilobit per second (kbps) or more is preferred. The memory 408 of the UND 402 may be implemented as RAM (random access memory) or a combination of RAM and non-volatile memory such as, but not limited to, magnetic disk storage. The memory 408 may contain magnetic disk storage sufficient to store an encoded movie, or with at least one gigabyte of free space. The memory 408 may contain the following:

- an operating system 420;
- internet access procedures 422 including a Web-browser such as, for example, Internet Explorer Version 4.0 or greater;
- media player and security technology 424;
- storage space for encrypted digital movie files 426;
- as well as other procedures and files (not shown).

Media player and security technology 424 comprises PD 416. PD 416 may be a standard component in the Media player and security technology 424. In one embodiment, PD 416 provides an encrypted memory space for storage of license data objects created by a license generator located at the NOC and transferred to the UND, as discussed above in reference to FIG. 3. Thus, the license data objects in PD 416 are themselves encrypted. Components within media player and security technology 424 are able to access the license data objects stored in PD 416 as discussed in more detail below in relation to FIG. 5.

The license for the requested movie has now been obtained by the user and stored on the user's UND, as described with reference to FIG. 3. For the present example it will be assumed that the user has already downloaded the requested encrypted movie file to memory storage such as storage space 426 within memory 408. However, the user may obtain a license for a movie file that the user will download at a future time. Similarly, the user may obtain a license at the same time that the movie file is downloaded to the user. Regardless of when the user decides to download the movie file, the user is required to have a license associated with the movie in the PD before the user may play that movie. When the associated license is present in the PD, the user may then view the movie by accessing media player and security technology 424.

Media Player And Security Technology

Figure 5:
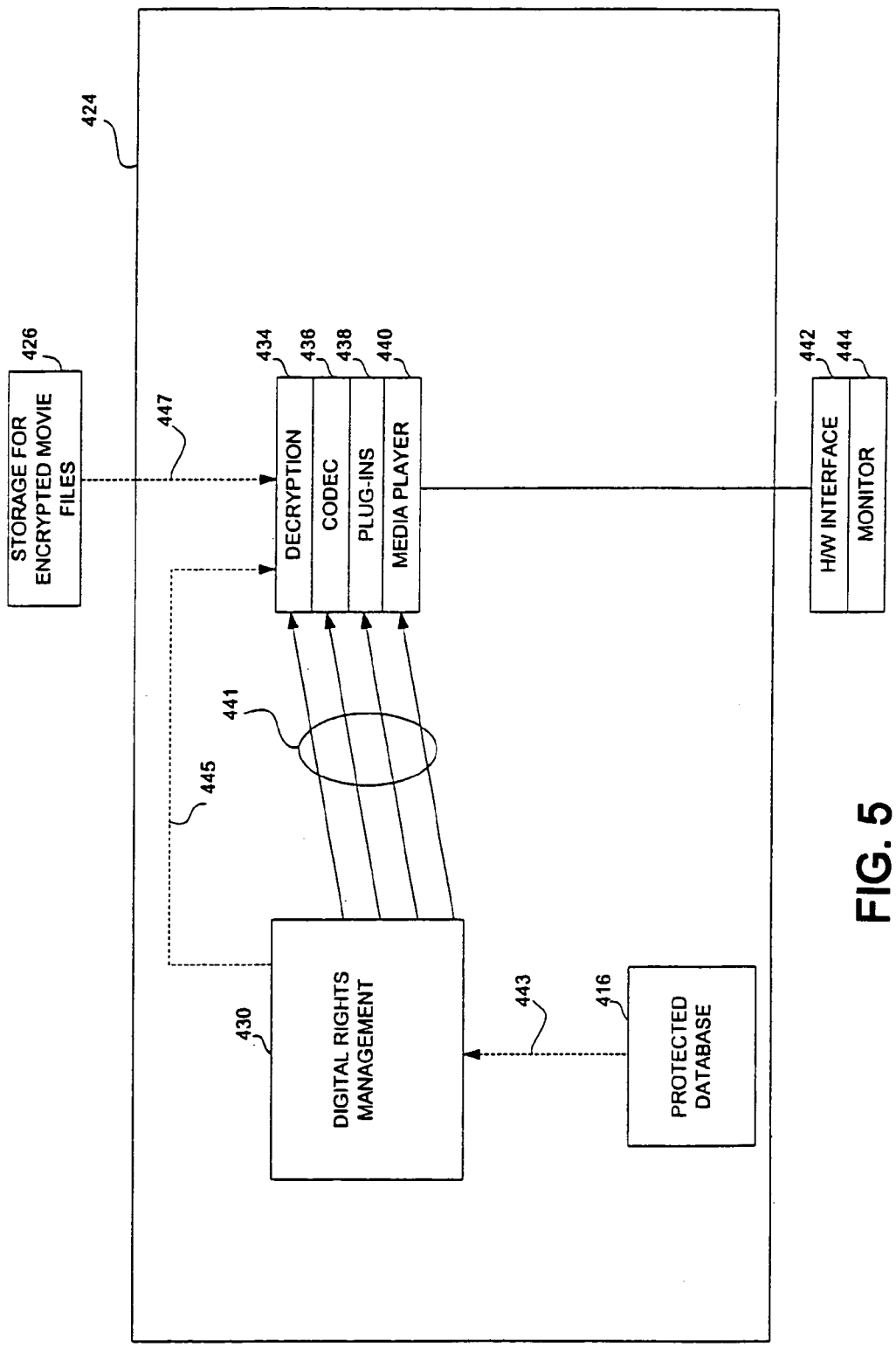
FIG. 5 is a simplified block diagram of functional components representing a software implemented media player and security technology according to an embodiment of the invention.

FIG. 5 illustrates a block diagram of functional components representing the software implemented media player and security technology 424, showing also that it has access to PD 416. Media player and security technology 424 comprises the software that allows a user of UND 402 to view a movie for which the user has obtained a license. As discussed above, PD 416 may contain one or more license data objects that have previously been generated by a license generator located at an NOC and that are associated with user-requested movies.

Digital Rights Management (DRM) functional component 430 is a block of code in the media player and security technology 424 that provides a secure environment within UND 402 for ensuring that only properly licensed movies are viewed on the UND to which the license was transferred. In one embodiment, DRM 430 does this by preventing encrypted content from being decrypted and accessed by the user in a user-perceptible form unless a valid license associated with the content has been enabled. DRM 430 may be run either in the user (application) space or in the kernel space. DRM 430 is protected against tampering by the use of code obfuscation and tamper detection techniques. DRM 430 also comprises anti-debugging capabilities that detect common debugging traps.

Besides DRM 430, media player and security technology 424 further comprises other blocks of code. Decryption block 434 decrypts the encrypted movie file. CODEC 436 decompresses the decrypted movie file. Plug-ins block 438 comprises any plug-in programs associated with media player 440. Media player 440 comprises a software implementation of a media player and may present to the user an interface comprising a movie display area for presenting the content in a user-perceptible form, and user-selectable operators such as, but not limited to, play, rewind, fast-forward, and pause buttons. Media player 440 may be communicatively coupled to monitor 444 through hardware interface 442.

In one embodiment, DRM 430 provides a secure environment within UND 402 by ensuring a secure inter-process communication (IPC) data stream between the components within media player and security technology 424. Ensuring a secure IPC data stream involves ensuring that components within media player and security technology 424, as well as other components (not shown) within UND 402, are not tampered with by unauthorized users intent on bypassing the license requirements. In one embodiment, this integrity check is accomplished by DRM 430 performing code authentication, represented by directed lines 441, on the other components within media player and security technology 424. For example, if the code within CODEC 436 had been tampered with in order to divert the decrypted movie file bits into another file, DRM 430 would detect this by, for example, code authentication procedures on CODEC 436. Thus, if the code within CODEC 436 had been tampered with, DRM 430 could shut down media player 440, inhibiting the viewing of movies.

In one embodiment, DRM 430 may access PD 416 through the use of a root encryption key within the code of DRM 430. By using the root encryption key, DRM 430 is able to access and decrypt encrypted license data objects within PD 416. This process is represented by dashed directed line 443. Thus, all the information contained in the license data objects, including the rental model, expiration date, UND identification information, media player identification information, and movie GUID, are made available in an unencrypted form to DRM 430.

Each movie file may be encrypted using a unique key. In one embodiment, movie files may be periodically re-encrypted and re-released, for example every thirty days. As discussed above, also included in the license data objects is the encryption key for decrypting the encrypted movie file. DRM 430 may pass the encryption key to decryption block 434. This process is represented by dashed directed line 445. In addition, an encrypted movie cannot be played without an enabled license. Each license is keyed to work with a specific movie file associated with that license and with a specific UND and media player. If the license is copied to a different UND, it will no longer be valid and will inhibit viewing of the movie.

When the user attempts to access the movie, DRM 430 compares the GUID of the movie with GUIDs contained in license data objects located in PD 416. If the result of a comparison is true, i.e. if the GUID of the movie matches a GUID in a license data object present in PD 416, then DRM 430 accesses the license data object associated with that movie within PD 416. DRM 430 then compares the UND and media player identification information in that license data object to UND 402 and media player 440. If any of the above comparisons are false, i.e. if there is not a match, then DRM 430 will deny enablement of the license. If the results of these comparisons are true, then DRM 430 further verifies that the attempted viewing of the movie conforms to the rental model contained in the license data object.

If all the comparisons are true, and if the viewing of the movie is in conformance with the rental model, and further, if the integrity checks performed by DRM 430 detect no tampering, then the license will be enabled. The encrypted movie file will then be transferred from storage block 426 to decryption block 434 of media player and security technology 424. This process is represented by dashed directed line 447. After being decrypted, the movie file will then proceed through CODEC 436 and become available in a decompressed form to media player 440. The user may then play the movie. Hardware interface 442 will convert the file into a user perceptible form on monitor 444.

In some embodiments, the rental model may allow the user only a certain number of viewings of the movie within a certain time period, for example, one viewing within a 24 hour period. In order to prevent the user from bypassing the rental model contained in the license by, for example, rewinding (or reversing) to the beginning of the movie just before the movie ends, watermark information can be inserted into a data field of the license data object by the license generator. DRM 430 may use the watermark information to control the rewind and fast-forward functions of media player 440 by allowing a user to rewind or fast-forward only a determined time interval from the current position in the movie. This time interval limit information may be enforced by DRM 430.

As an example, in one embodiment, the watermark information could direct DRM 430 to enforce time interval limits of ten minutes for forward or reverse progression through the movie. The watermarks would then restrict the user to rewinding or fast-forwarding the movie file in ten minute segments. In other embodiments, the watermarks may already be present at timed intervals in the movie file at the time the movie file is transferred to UND 402 and may be enforced by DRM 430 when the movie file is played.

In yet other embodiments, DRM 430 may enforce the time interval limits defined by the watermark information by tracking the user's progress in viewing the movie and restricting the rewinding or fast-forwarding of the movie file by means of, for example, a hardware or software implemented timer. The timer may time the user's progress through the movie and when a rewind or fast-forward command is detected, DRM 430 may ensure, through use of the timer, that the user does not rewind or fast-forward beyond the time interval limits.

In one embodiment, a purchase model license may be chosen by the user in place of a rental model license. The purchase model license may allow the purchaser to view a movie on any machine with a media player an unlimited number of times. In one embodiment, the user may still be required to connect to the main website to verify the terms of the license before viewing the movie is possible.

Figure 6:
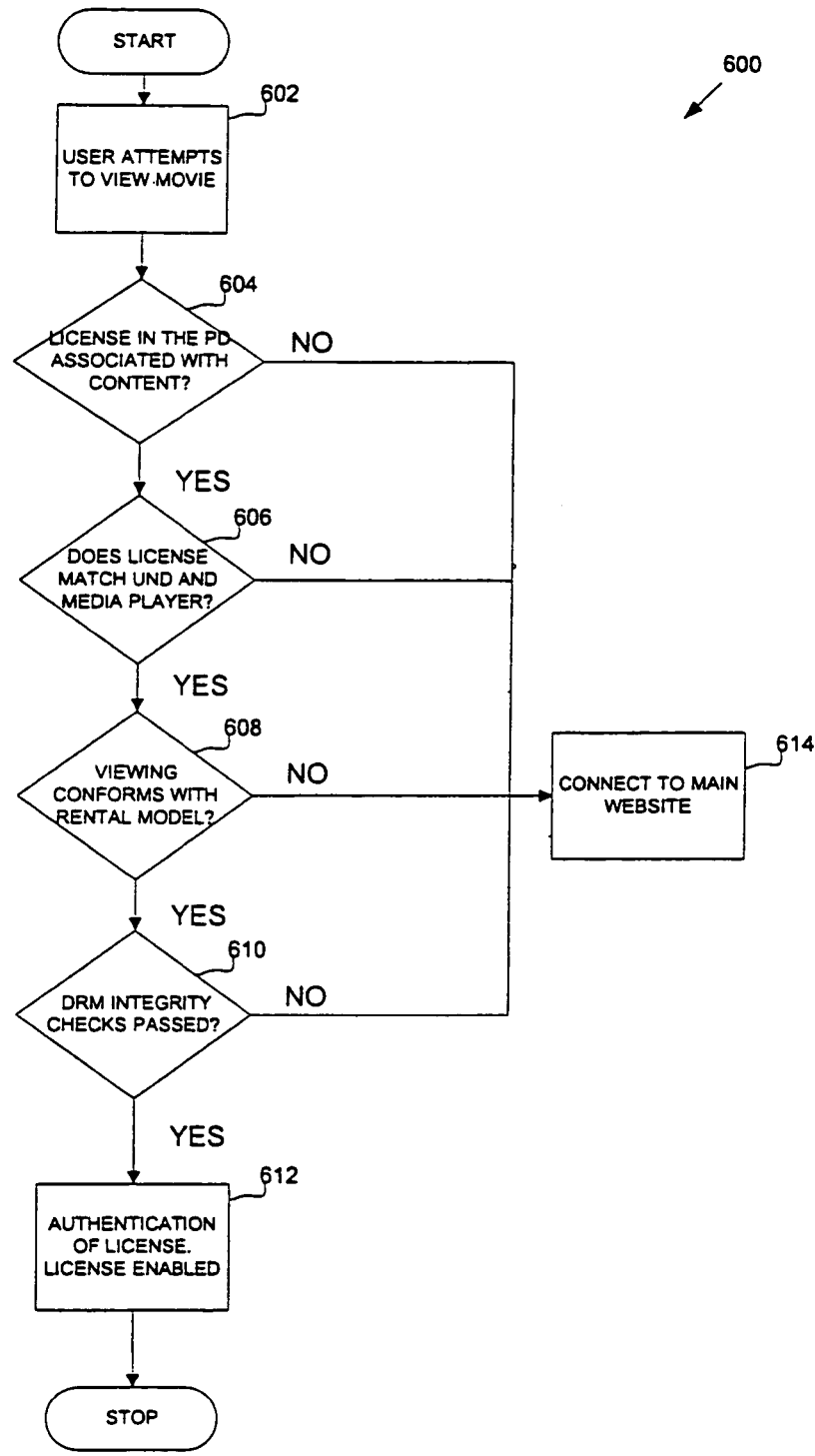
FIG. 6 shows a flowchart of process steps for controlling authorized viewing of content according to an embodiment of the invention.

FIG. 6 shows a flowchart of the authorization process steps 600 performed, according to one embodiment, by the media player and security technology to ensure only authorized viewing of a movie. At step 602, the user has decided to play a previously downloaded movie. The user will attempt to play this movie using the media player.

At step 604, the DRM on the user's UND seeks for a license associated with the movie in the PD. If the associated license is found in the PD, the authorization process continues. If the associated license is not found, the user's UND will be connected to the main website, as shown in step 614, and the user will be queried about whether the user wishes to purchase a license.

At step 606, the DRM confirms that the UND and media player identification information contained in the license matches the user's UND and media player. If the identification information matches, the authorization process continues. If the identification information does not match, the user's UND will be connected to the main website, as shown in step 614, and the user will be queried about whether the user wishes to purchase a new license.

At step 608, the DRM confirms that the user's viewing of the movie conforms with the rental model. For example, if the rental model called for a one-time viewing, then the second time the user attempted to view the movie, the DRM would inhibit the second viewing. If the user's viewing of the movie conforms with the rental model, the authorization process continues. If the user's viewing of the movie does not conform with the rental model, the user's UND will be connected to the main website, as shown in step 614, and the user will be queried about whether the user wishes to purchase a new license.

At step 610 the DRM confirms that the user's UND has passed all integrity checks performed by the DRM. If all tests have been passed, then at step 612 the license is found to be authentic and is enabled. The user may now play the movie on the media player. If all tests have not been passed, then, in one embodiment, the user may be connected to the main website, as shown in step 614, to receive a revocation certificate, as described below.

In some embodiments, at step 614 the DRM on the user's UND may query the user about whether the user wishes to purchase a license rather than the user's UND being connected to the main website for the user to be queried.

Revocation

At various times it will be desirable to control the ability of users to access particular content within particular DRM environments and by particular media players. For example, when DRM security upgrades are performed or when tampering with components within the media player and security technology is detected by integrity checks performed by the DRM. In addition, when the security of particular movie files has been compromised, a system and method is required to revoke previously issued access rights to content in order to provide better security for the secure digital content licensing system and method described above.

In the case where a DRM has been upgraded to a higher security level or when particular components of the media player and security technology have been compromised, one embodiment of a system and method for controlling the ability of users to access content comprises specifying within the license particular DRM versions for which the license will not be valid. This information may be added to the application servers located in the NOC and may then comprise a part of the business rules contained within the application servers.

Thus, when a license is requested by a user, the application servers will pass to the license generator information about the DRM versions that are not authorized to play the requested content. The license generator will then include that DRM version information in the generated license data object that is transferred to the PD. If the user attempts to play the movie on a UND with a unauthorized version of the DRM, the DRM will detect this and inhibit viewing of the content.

Additionally, information may be added to the business rules of the application servers located in the NOC that inhibits the creation of licenses for particular DRM environments or for particular content. Thus, if the license is being requested by a user and the user's UND contains components that are known to have been compromised, or if the requested content has been compromised, the business rules within the application servers will inhibit the creation of the license.

In the case where rights to access particular content have already been issued in the form of a license that now resides in the PD of the user's UND, one embodiment allows active revocation of those rights through the issuance of revocation certificates. Revocation certificates revoke previously issued licenses for content when, for example, that content is known to have been compromised in some way. In addition, revocation certificates may be issued for compromised software components within the media player and security technology on the UND.

Once the license for the compromised content or the right to use the compromised software component to view the content has been revoked, the content may not be played until the content or the components have been upgraded. As an example, if the CODEC within the media player and security technology of a particular UND has been compromised in some way, a revocation certificate may be transferred to that UND that will inhibit the playing of any movies until the CODEC is upgraded to a secure version.

Thus, in one embodiment, the revocation certificate may be a data object with a data field that contains information on the unauthorized CODEC. The revocation certificate will be transferred to the PD of the UND. Placement of the revocation certificate into the PD ensures the security of the revocation certificate. Thus, unauthorized removal of the revocation certificate from the UND is made more difficult. The DRM code may then access the revocation certificate, for example by using the DRM's root key, and read the information from the data field and if it matches the CODEC on the UND, the DRM code may inhibit viewing of the content.

In some embodiments, revocation certificates may periodically be transferred to UNDs from a revocation server that may be located at the NOC. Thus, in one embodiment, obtaining a license may require that the DRM on the user's UND has polled the revocation server within a specified period of time, for example, within the last ten days. Polling the revocation server allows the revocation server to transfer any revocation certificates to the polling UND. In one embodiment, if the DRM has not polled the revocation server within the specified period of time, and thus has not received the applicable revocation certificates, then the DRM may inhibit playback of content.

In another embodiment, the revocation information may be attached to a license data object that is issued by the license generator. In this embodiment, the revocation information may be added to the business rules of the application servers located at the NOC and passed to the license generator for attachment to a license data object. Thus, when the user requests and receives the license data object into the PD of the user's UND, the revocation information will be accessible by the DRM, for example by using the DRM's root key. Placement of the revocation information into the PD ensures the security of the revocation information. Thus, unauthorized removal of revocation information from the UND is made more difficult.

Several aspects of one implementation of the secure digital content licensing system and method have been described. However, various implementations of the secure digital content licensing system and method provide numerous features including, complementing, supplementing, and/or replacing the features described above. Features may be implemented as part of the server or as part of the user's UND in different implementations.

It is to be understood that even though numerous characteristics and advantages of various embodiments of the present invention have been set forth in the foregoing description, together with details of the structure and function of various embodiments of the invention, this disclosure is illustrative only.

In addition, although the embodiment described herein is directed to a secure digital content licensing system and method for on-line rental of movies, it will be appreciated by those skilled in the art that the teaching of the present invention may be applied to other systems. In fact, systems for online rental of digitally encoded songs, books, television programming, radio programming, and any other content (audio, video, text, etc.) which may be digitized or encoded and stored as an electronic file are within the teachings of the present invention, without departing from the scope and spirit of the present invention.

The present invention provides many advantages over known techniques. Advantages of the invention include the ability to securely control access to content by providing a system and method for generating licenses for content based on a particular rental model for that particular content.

Further advantages of the invention include the ability to revoke the right to view particular content on particular media players within particular media and security procedure environments. In addition, the present invention provides a system and method for issuing revocation certificates to particular UNDs that inhibits playing of particular content or the playing of content within a particular media and security procedure environment.

Having disclosed exemplary embodiments and the best mode, modifications and variations may be made to the disclosed embodiments while remaining within the scope of the invention as defined by the following claims.

What is claimed is:

1. A system for secure licensing of content to a user on a user network-enabled device, the system comprising:
   at least one server network device communicatively coupled to the user network-enabled device;
   wherein the at least one server network device is programmed to transfer selected encrypted content to the user network-enabled device; and
   a license generator, the license generator being programmed to generate an encrypted a license associated with the selected encrypted content, the encrypted license comprising
   access information defining conditions for controlling the user network-enabled device, and
   an encryption key to enable the user network-enabled device to produce a user-perceptible form of the selected encrypted content when the conditions defined by the access information conditions are met and to inhibit production of a user-perceptible form of the selected encrypted content when the conditions defined by the access information are not met; and
   a root key for decrypting the encrypted license to allow the access information and the encryption key in the encrypted license to be accessed by a media player and security technology programmed on the user network-enabled device, the media player and security technology controlling a specific media player on the user network-enabled device to produce the user-perceptible form of the selected encrypted content.

2. The system recited in claim 1, wherein the at least one server network device is further programmed to receive at a first node on the network a request for content from the user network-enabled device at a second node on the network, wherein the transfer of selected content comprises transferring the requested content in response to the receipt of the request from the user network-enabled device at the second node.

3. The system recited in claim 1, wherein the content is encrypted.

4. The system recited in claim 1, wherein the at least one server network device is further programmed to receive at the first node on the network a request for the license from the user network-enabled device at the second node on the network; and
   wherein the at least one server network device is further programmed to transfer the requested license to the user network-enabled device at the second node.

5. The system recited in claim 1, wherein the license is a data object.

6. The system recited in claim 5, wherein the data object comprises a plurality of data fields, at least a portion of the plurality of data fields containing the access information.

7. The system recited in claim 1, wherein the access information comprises at least one of a content rental model, an expiration date of the license, user network-enabled device identification information, media player identification information, a GUID identifying particular content, and an encryption key for decrypting encrypted content.

8. The system recited in claim 7, wherein the content rental model defines at least one of a specified period of time and a specified number of plays.

9. The system recited in claim 7, wherein the content rental model defines an unlimited number of plays on any user network-enabled device.

10. The system recited in claim 7, wherein the content rental model includes a watermark, the watermark allowing the user to rewind only a determined time interval from the current position in the movie.

11. The system recited in claim 1, further comprising at least one application server, the at least one application server being communicatively coupled to both the at least one server network device and the license generator;
   wherein the at least one application server is programmed to receive the license request from the at least one server network device and to transfer the license request to the license generator.

12. The system recited in claim 11, wherein the at least one application server is further programmed to provide business rules to the license generator, the business rules being included in the license request by the at least one application server before transferring the license request to the license generator, the business rules defining the types of licenses that the license generator may generate.

13. The system recited in claim 11, wherein the at least one application server is further programmed to gather and store personalization information about users.

14. The system recited in claim 11, wherein the at least one application server is further programmed to create dynamic Web pages.

15. The system recited in claim 11, further comprising a firewall situated between the at least one server network device and the at least one application server, the firewall preventing unauthorized access to the at least one application server.

16. The system recited in claim 11, further comprising a firewall situated between the at least one application server and the license generator, the firewall preventing unauthorized access to the license generator.

17. The system of claim 1, wherein the encrypted license is further associated with a specific user-network enabled device and the specific media player, such that the encrypted license is configured to enable the user-perceptible form of the selected encrypted content on the specific user network-enabled device and the specific media player therein.

18. A method for secure licensing of content to a user on a user network-enabled device, the method comprising:
   transferring selected encrypted content to the user network-enabled device; and
   generating a an encrypted license associated with the selected encrypted content, the encrypted license comprising:
   access information defining conditions for controlling the user-network enabled device; and
   an encryption key to enable the user network-enabled device to produce a use-perceptible form of the selected encrypted content when the conditions defined by the access information are met and to inhibit production of a user-perceptible form of the selected encrypted content when the conditions defined by the access information are not met;
   decrypting the encrypted license to allow the access information and the encryption key in the encrypted license to be accessed by a media player and security technology programmed on the user network-enabled device; and p1 controlling a specific media player on the user network-enabled device to produce the user-perceptible form of the selected encrypted content.

19. The method recited in claim 18, wherein the license is a data object.

20. The method recited in claim 19, wherein the data object comprises a plurality of data fields, at least a portion of the plurality of data fields containing the access information.

21. The method recited in claim 18, wherein the access information comprises at least one of a content rental model, an expiration date of the license, user network-enabled device identification information, media player identification information, a GUID identifying particular content, and an encryption key for decrypting encrypted content.

22. The method of claim 18, wherein the encrypted license associated with the selected encrypted content is further associated with a specific user-network enabled device and the specific media player, such that the encrypted license is configured to enable the user-perceptible form of the selected encrypted content on the specific user network-enabled device and the specific media player therein.

23. A system for secure licensing of content to a user on a user network-enabled device, the system comprising:
at least one server network device communicatively coupled to the user network-enabled device;
wherein the at least one server network device is programmed to transfer a an encrypted license associated with the selected encrypted content to the user network-enabled device, the encrypted license comprising access information which defines access rights to the selected encrypted content and an encryption key to enable the user network-enabled device to produce a use-perceptible form of the selected encrypted content; and
wherein the user network-enabled device is programmed to provide media player and security technology, the media player and security technology verifying the form of the selected encrypted content only when the selected encrypted content is properly licensed and inhibiting the user network-enabled device from producing a user-perceptible form of the selected encrypted content when the selected encrypted content is not properly licensed; and
a root key for decrypting the encrypted license to allow the access information and the encryption key in the encrypted license to be accessed by. the media player and security technology, the media player and security technology controlling a specific media player on the user network-enabled device to produce the user-perceptible form of the selected encrypted content.

24. The system recited in claim 23, wherein the media player and security technology comprises a media player for displaying the content in a user-perceptible form.

25. The system recited in claim 24, wherein the media player and security technology further comprises at least one of decryption code for decrypting encrypted content, a CODEC for decompressing compressed content, a monitor for displaying the media player to the user, and a hardware interface between the media player and the monitor.

26. The system recited in claim 25, wherein the media player and security technology further comprises digital rights management code for providing a secure inter-process communication data stream between the decryption code, the CODEC, the media player, the hardware interface, and the monitor.

27. The system recited in claim 26, wherein the digital rights management code is protected against tampering by at least one of code obfuscation and anti-debugging techniques.

28. The system recited in claim 26, wherein the digital rights management code provides the secure inter-process communication data stream between the decryption code, the CODEC, the media player, the hardware interface, and the monitor by performing an integrity check on at least one of the media player, the decryption code, the CODEC, the hardware interface, and the monitor in order to detect tampering.

29. The system recited in claim 28, wherein the digital rights management code inhibits the display of content in a user-perceptible form when at least one of the media player, the decryption code, the CODEC, the hardware interface, and the monitor do not pass the integrity check.

30. The system recited in claim 26, wherein the media player and security technology further comprises a protected database in communication with the digital rights management code;
wherein the protected database securely stores transferred licenses.

31. The system recited in claim 30, wherein the protected database is protected by encryption methods.

32. The system recited in claim 31, wherein the digital rights management code comprises the a root key, the root key unlocking licenses within the protected database.

33. The system recited in claim 31, wherein the digital rights management code examines the access information within the unlocked license and determines the access rights to the content provided by the unlocked license.

34. The system recited in claim 24, wherein the access information comprises at least one of a content rental model, an expiration date of the license, user network-enabled device identification information, media player identification information, a GUID identifying particular content, and an encryption key for decrypting encrypted content.

35. The system recited in claim 34, wherein the digital rights management code allows the user network-enabled device to produce a user-perceptible form of the content only when the content is properly licensed by enforcing compliance by the user with the content rental model contained in the unlocked license.

36. The system recited in claim 34, wherein the digital rights management code allows the user network-enabled device to produce a user-perceptible form of the content only when the content is properly licensed by comparing user network-enabled device identification information in the unlocked license with the user network-enabled device on which the digital rights management code resides.

37. The system recited in claim 34, wherein the digital rights management code allows the user network-enabled device to produce a user-perceptible form of the content only when the content is properly licensed by comparing media player identification information in the unlocked license with the media player on the user network-enabled device on which the digital rights management code resides.

38. The system recited in claim 34, wherein the digital rights management code passes the encryption key contained in the unlocked license to the decryption code in order to decrypt the encrypted content.

39. The system of claim 23, wherein the encrypted license is further associated with a specific user-network enabled device and the specific media player, such that the encrypted license is configured to enable the user-perceptible form of the selected encrypted content on the specific user network-enabled device and the specific media player therein.

40. A method for secure licensing of content to a user on a user network-enabled device, the method comprising:

transferring a an encrypted license associated with the selected encrypted content to the user network-enabled device, the encrypted license comprising access information which defines access rights to the selected encrypted content and an encryption key to enable the user network-enabled device to produce a use-perceptible form of the selected encrypted content; and providing media player and security technology on the user network-enabled device, the media player and security technology verifying the access rights and allowing the user network-enabled device to produce a user-perceptible form of the selected encrypted content only when the selected encrypted content is properly licensed and inhibiting the user network-enabled device from producing a user-perceptible form of the selected encrypted content when the selected encrypted content is not properly licensed; and decrypting the encrypted license to allow the access information and the encryption key in the encrypted license to be accessed by the media player and security technology, the media player and security technology controlling a specific media player on the user network-enabled device to produce the user-perceptible form of the selected encrypted content.

41. The method recited in claim 40, wherein the media player and security technology comprises a media player for displaying the content in a user-perceptible form.

42. The method recited in claim 41, wherein the media player and security technology further comprises at least one of decryption code for decrypting encrypted content, a CODEC for decompressing compressed content, a monitor for displaying the media player to the user, and a hardware interface between the media player and the monitor.

43. The method recited in claim 42, wherein the media player and security technology further comprises digital rights management code for providing a secure inter-process communication data stream between the decryption code, the CODEC, the media player, the hardware interface, and the monitor.

44. The method recited in claim 43, wherein the media player and security technology further comprises a protected database in communication with the digital rights management code;

wherein the protected database securely stores transferred licenses.

45. The method recited in claim 44, wherein the protected database is protected by encryption methods.

46. The method recited in claim 44, wherein the digital rights management code comprises a root key, the root key unlocking licenses within the protected-database.

47. The method recited in claim 46, wherein the digital rights management code examines the access information within the unlocked license and determines the access rights to the content provided by the unlocked license.

48. The method recited in claim 41, wherein the access information comprises at least one of a content rental model, an expiration date of the license, user network-enabled device identification information, media player identification information, a GUID identifying particular content, and an encryption key for decrypting encrypted content.

49. The method recited in claim 48, wherein the digital rights management code allows the user network-enabled device to produce a user-perceptible form of the content only when the content is properly licensed by enforcing compliance by the user with the content rental model contained in the unlocked license.

50. The method recited in claim 48, wherein the digital rights management code allows the user network-enabled device to produce a user-perceptible form of the content only when the content is properly licensed by comparing user network-enabled device identification information in the unlocked license with the user network-enabled device on which the digital rights management code resides.

51. The method recited in claim 48, wherein the digital rights management code allows the user network-enabled device to produce a user-perceptible form of the content only when the content is properly licensed by comparing media player identification information in the unlocked license with the media player on the user network-enabled device on which the digital rights management code resides.

52. The method recited in claim 48, wherein the digital rights management code passes the encryption key contained in the unlocked license to the decryption code in order to decrypt the encrypted content.

53. The method of claim 40, wherein the encrypted license associated with the selected encrypted content is further associated with a specific user-network enabled device and the specific media player, such that the encrypted license is configured to enable the user-perceptible form of the selected encrypted content on the specific user network-enabled device and the specific media player therein.

* * * * *